United States Patent Office 3,309,012
Patented Mar. 14, 1967

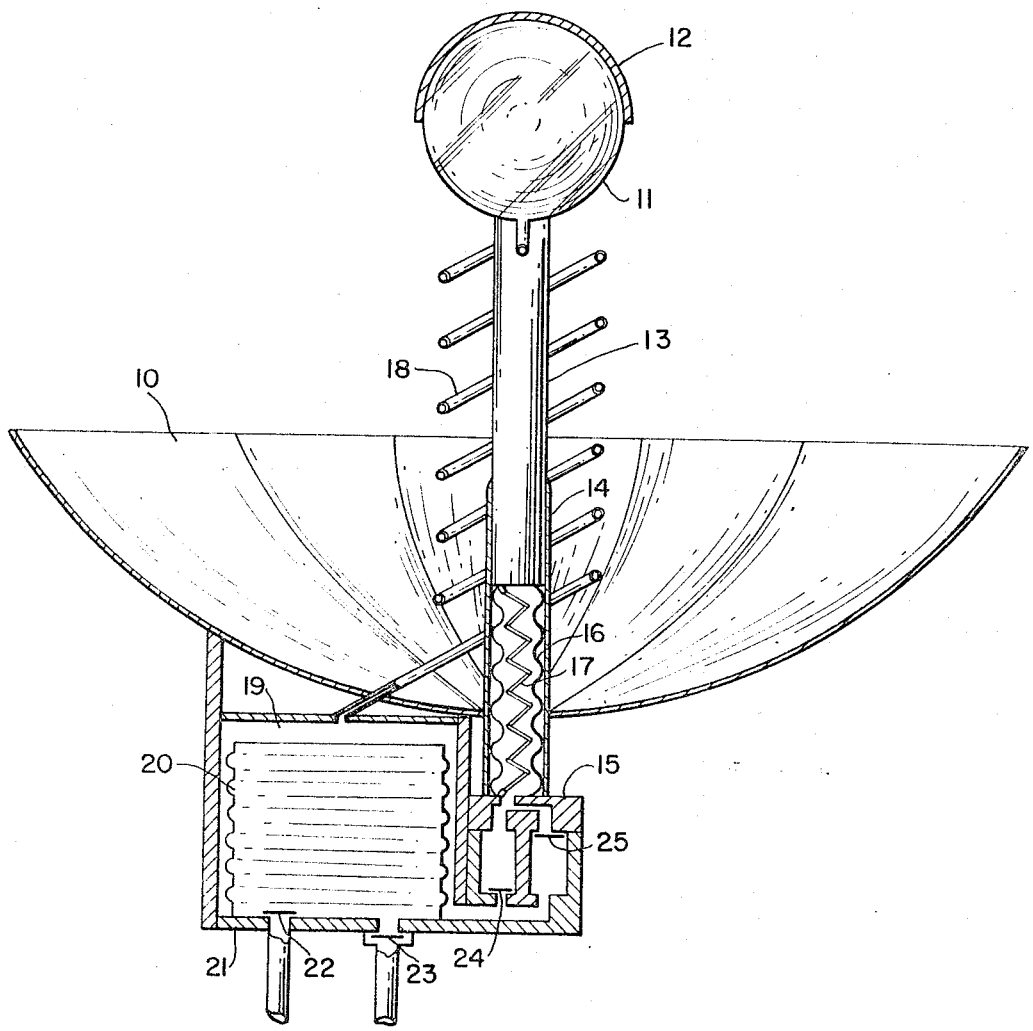
FIG. I
INVENTORS
FRANKLIN W. BOOTH
HUBERT K. CLARK
ATTORNEYS

3,309,012
THERMAL PUMP-COMPRESSOR FOR SPACE USE
Franklin W. Booth, Hampton, and Hubert K. Clark, Newport News, Va., assignors to the United States of America as represented by the Administrator of the National Aeronautics and Space Administration
Filed Apr. 2, 1963, Ser. No. 270,118
10 Claims. (Cl. 230—162)

The invention described herein may be manufactured and used by or for the Government of the United States of America for governmental purposes without the payment of any royalties thereon or therefor.

The invention relates to a thermal pump and more specifically to a thermal pump-compressor for converting heat energy from the sun into another form of energy.

In the past there have been many methods use to convert heat energy from the sun into another form of energy. One of these methods consist of heating a volatile liquid by sun rays to create a gas pressure, using this created gas pressure to drive a turbine, and then converting the gas back to a liquid to be used again. The method used to convert the gas back to a liquid has been to run the gas through a pipe which is located in a large container of water to cool the gas. This method requires large and heavy equipment making it unsuitable for space use. The present invention utilizes a method similar to the one outlined above; however, the device that incorporates this invention is small and compact which makes it ideal for use on board space operating vehicles where weight and space accommodations are limited. The device was designed to operate pneumatic computing mechanisms on board a space vehicle. However, the device might be used to operate any pneumatic mechanism on or off a space vehicle.

The invention consists of means for heating, by rays from the sun, an enclosed volatile liquid to create a gas pressure. This created gas pressure is applied to a pumping bellows to collapse it and create a compression stroke of the pumping bellows. The created gas pressure is also applied to a means for moving the enclosed volatile liquid out of the rays of the sun after the pumping bellows has been collapsed. When the enclosed volatile liquid is moved out of the rays of the sun it will cool and the created gas pressure will decrease. This will cause the pumping bellows to expand resulting in a suction stroke of the pumping bellows. The decreased gas pressure will also cause the means for moving the enclosed volatile liquid out of the rays of the sun to move the enclosed volatile liquid back into the rays of the sun to start another cycle.

An object of this invention is to provide a device for converting energy from the sun into another form of energy.

Another object of this invention is to provide a device to be used on a space vehicle for converting energy from the sun into another form of energy.

A further object of this invention is to provide a device for converting energy from the sun into air pressures which can be used to operate pneumatic mechanisms on board a space vehicle.

A still further object of this invention is to provide a device which utilizes energy from the sun to operate a pumping bellows.

Yet another object of this invention is to provide a method for converting heat energy from the sun into another form of energy.

Other objects and a fuller understanding of this invention may be had by referring to the following specification and the accompanying drawing in which FIG. 1 shows a cross-sectional view of a device that incorporates this invention.

Referring now to FIG. 1 there is shown a solar reflector 10 which reflects the sun rays that strike it and concentrates these rays in a focal plane. A thermal bulb 11 containing a volatile liquid such as dichloradifluoromethane is located in this focal plane. A shield 12 partially covers thermal bulb 11 to shield the bulb from direct sun rays. A stem 13 is attached to thermal bulb 11 and extends into a tube 14. The inside diameter of tube 14 is large enough to allow stem 13 to move up and down freely in it. One end of tube 14 is attached to an enclosure 15. Also attached to enclosure 15 is one end of a positioning bellows 16. The other end of positioning bellows 16 extends up into tube 14 and is attached to stem 13 so that when the bellows expands and collapses stem 13 will move up and down in tube 14. A spring 17, with one of its ends attached to enclosure 15 and with its other end attached to positioning bellows 16, exerts a force which tends to collapse the bellows.

A capillary tube 18 connects thermal bulb 11 to a chamber 19. Located inside chamber 19 is a pumping bellows 20 which is attached to a side 21 of chamber 19. A check valve 22 is placed in side 21 to allow air to flow into pumping bellows 20 while it is expanding. While bellows 20 is collapsing valve 22 will be closed and no air will pass through the valve. A check valve 23 is placed in side 21 to allow air to flow out of pumping bellows 20 while it is collapsing. While pumping bellows 20 is expanding, valve 23 will be closed and no air will flow through it. Chamber 19 is connected to the inside of positioning bellows 16 through an up positioning spring loaded check valve 25.

Operation

At the beginning of operation, thermal bulb 11 is in the focal plane of solar reflector 10, pumping bellows 20 is extended as shown, and positioning bellows 16 is collapsed. The solar energy which is concentrated on thermal bulb 11 by solar reflector 10 boils the volatile liquid inside the bulb increasing the gas pressure therein. This increase in gas pressure is transmitted through capillary tube 18 into chamber 19 outside pumping bellows 20. As the gas pressure in chamber 19 increases, pumping bellows 20 collapses causing a compression stroke of pumping action. This compression stroke causes air pressure to flow through outlet valve 23. The spring on spring loaded check valve 24 is strong enough to keep the valve from opening until after pumping bellows 20 has collapsed.

After pumping bellows 20 has collapsed, the gas pressure in chamber 19 will continue to increase until valve 24 opens. When valve 24 opens, the gas pressure in chamber 19 will move through valve 24 into the positioning bellows 16 to expand them. This expansion of bellows 16 moves stem 13 up in tube 14 which moves thermal bulb 11 out of the focal plane of solar reflector 10.

After thermal bulb 11 moves out of the focal plane of solar reflector 10, it will begin to cool since it will receive no heat from solar reflector 10 nor will it receive any heat directly from the sun because of shield 12. While thermal bulb 11 cools, the gas pressures in thermal bulb 11, and chamber 19 will decrease. As the gas pressure in chamber 19 decreases, pumping bellows 20 will expand causing the suction stroke of pumping action. The spring on spring loaded check valve 25 is strong enough to keep the valve from opening until after pumping bellows 20 has expanded thereby keeping thermal bulb 11 out of the focal plane of reflector 10. After pumping bellows 20 has expanded, the gas pressure in chamber 19 will continue to decrease until valve 25 opens. Then the gas pressure in bellows 16 will move out through valve 25 and spring 17 will collapse bellows 16 which moves thermal bulb 11 back into the focal plane of reflector 10. Spring 17 is needed because it is difficult to create a vacuum in bellows 16 to collapse them. The device is now ready to repeat the cycle.

It will be apparent to those skilled in the art that the novel principles of the invention disclosed herein in connection with the specific exemplification thereof will suggest various modifications and application of the same. For example, instead of moving the thermal bulb out of the focal plane of the solar reflector, the solar reflector could be tilted to move its focal plane away from the thermal bulb. Or instead of using the created gas pressure to collapse a bellows, it could be used to drive a turbine. It is accordingly desired that in construing the breadth of the appended claims they shall not be limited to the spcific exemplification of the invention described herein.

What is claimed is:

1. A solar pump comprising: a solar reflector which concentrates in a focal plane the sun rays that strikes it; a thermal bulb containing a volatile liquid located in said focal plane to heat the volatile liquid thereby creating a gas pressure; a pumping means for producing a compression stroke when a pressure is applied to it and for producing a suction stroke when the pressure is removed; means for applying said created gas pressure to said pumping means to cause a compression stroke of said pumping means; control means for moving said thermal bulb out of said focal plane when a gas pressure is applied to it and for moving said thermal bulb back into said focal plane when the gas pressure is removed; means for applying said created gas pressure to said control means after said compression stroke to move said thermal bulb out of said focal plane thereby decreasing said created gas pressure to cause a suction stroke of said pumping means; and means for removing said created gas pressure from said control means after said suction stroke to move said thermal bulb back into said focal plane.

2. A solar pump as claimed in claim 1 wherein said means for applying said created gas pressure to said control means includes a check valve.

3. A solar pump as claimed in claim 1 wherein said means for removing said created gas pressure from said control means includes a check valve.

4. A solar pump as claimed in claim 1 wherein said pumping means is a pumping bellows.

5. A solar pump as claimed in claim 1 wherein said thermal bulb has a metal shield attached to it on its side next to the sun.

6. A solar pump as claimed in claim 1 wherein said control means includes: a positioning bellows connected to be extended by said created gas pressure; a tube with said positioning bellows extending into one end of said tube; and a stem with one end attached to said thermal bulb and with its other end extending into the other end of said tube and attached to said positioning bellows whereby when the created gas pressure increases and positioning bellows extends into said tube and pushes said thermal bulb out of said focal plane.

7. A solar pump as claimed in claim 1 wherein said control means includes a spring.

8. A solar pump as claimed in claim 4 wherein said pumping bellows includes an intake valve and a pressure outlet valve.

9. A solar pump as claimed in claim 4 wherein said means for applying said created gas pressure to said pumping bellows includes capillary tubing connected to the said thermal bulb and to a chamber enclosing said pumping bellows.

10. A solar pump comprising: a solar reflector for collecting rays from the sun and concentrating them in its focal plane; a thermal bulb containing a volatile liquid located in said focal plane of the solar reflector to heat the volatile liquid and cause the gas pressure inside the thermal bulb to increase; a chamber connected to said thermal bulb through a capillary tube; a pumping bellows located in said chamber so that when the gas pressure inside said chamber increases the pumping bellows will collapse causing a compression stroke of the pump; a stem with one of its ends attached to said thermal bulb; a tube for the stem to slide into one of its ends; a positioning bellows located in the other end of the tube and attached to the other end of the stem; means connecting said chamber to said positioning bellows so that when the gas pressure increases in said chamber the positioning bellows will expand and move the thermal bulb out of the focal plane of the solar reflector, cool said volatile liquid, decrease said increased gas pressure, and expand said collapsed pumping bellows to cause a suction stroke of the pump; and means responsive to said decrease in gas pressure for moving said thermal bulb back into said focal plane after the pumping bellows has expanded.

References Cited by the Examiner

UNITED STATES PATENTS

| | | | |
|---|---|---|---|
| 2,152,802 | 4/1939 | Harris | 103—148 |
| 2,688,922 | 9/1954 | Bonaventura et al. | 103—1 |
| 2,688,923 | 9/1954 | Bonaventura et al. | 103—1 |

ROBERT M. WALKER, *Primary Examiner.*

SAMUEL W. ENGLE, *Examiner.*